United States Patent [19]
Schlossberg et al.

[11] 4,126,832
[45] Nov. 21, 1978

[54] DIFFRACTION GRATING COUPLED OPTICALLY PUMPED LASER

[75] Inventors: Howard R. Schlossberg, Lexington; Harold R. Fetterman, Waltham, both of Mass.

[73] Assignee: The United States of America as represented by the Secretary of the Air Force, Washington, D.C.

[21] Appl. No.: 800,985

[22] Filed: May 26, 1977

[51] Int. Cl.² .............................................. H01S 3/094
[52] U.S. Cl. ............................ 331/94.5 C; 331/94.5 P
[58] Field of Search .................... 331/94.5 C, 94.5 D, 331/94.5 G, 94.5 P; 350/162

[56] References Cited

U.S. PATENT DOCUMENTS 3,611,181  10/1971  Lary et al. ..................... 331/94.5 C Primary Examiner—William L. Sikes
Attorney, Agent, or Firm—Joseph E. Rusz; Jacob N. Erlich

[57] ABSTRACT

An optically pumped submillimeter laser system having a laser cavity which contains therein a diffraction grating. The diffraction grating is used simultaneously as an efficient first order diffractor for coupling in the short wavelength pump radiation and as a zero order or highly reflecting plane mirror for the production of an output of (long wavelength) submillimeter wavelength.

8 Claims, 2 Drawing Figures

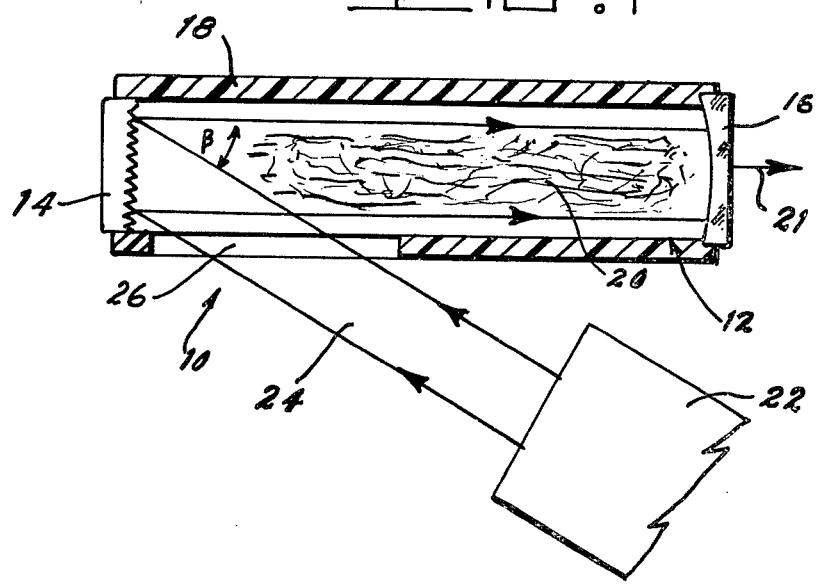
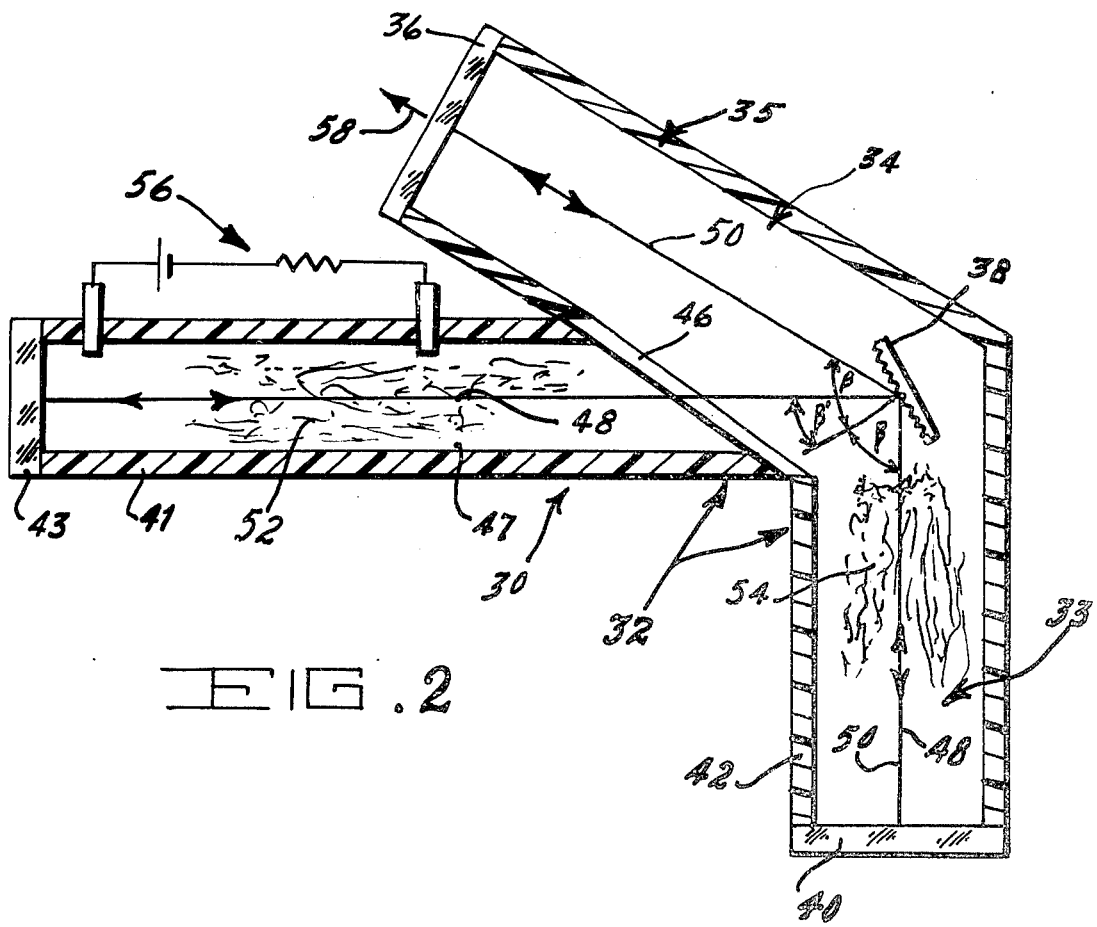

DIFFRACTION GRATING COUPLED OPTICALLY PUMPED LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optically pumped lasers, and more particularly to a diffraction grating coupled optically pumped submillimeter laser system.

Submillimeter laser technology finds applicability in many new areas. Perhaps the most immediate requirement for submillimeter systems is in plasma diagnostics. Submillimeter lasers can be used in the CW mode in interferometric arrangement or pulsed in high power Thompson scattering experiments. In either case the submillimeter frequencies are uniquely capable of making measurements at fusion densities and temperatures. For example, a typical angle of Thompson scattering for 500-$\mu$ radiation from a dense plasma at a $T_i$ (ion temperature) of 2keV would be about 30°. This is in contrast to a $CO_2$ laser which requires a scattering angle of less than 1°. This small-angle scattering suffers from severe stray light problems and from a lack of flexibility necessary to avoid the effects of plasma-density fluctuations.

The wavelengths of submillimeter lasers also are particularly appropriate for high-resolution, all-weather aircraft landing systems. Narrow beamwidths achievable with practical-size antennas imply superior angular resolution at these frequencies. The wide video bandwidths available make narrow pulse widths and excellent radial resolution available. Submillimeter lasers also offer very attractive characteristics for short-range surveillance radars.

While near-infrared and visible lasers offer better performance under clear-weather conditions, in dense fog, where the radar is most needed, the shorter wavelengths are severely scattered. The droplet size distribution of typical fogs and clouds peaks in the range of 1$\mu$m to 10$\mu$m. Since particle scattering efficiency decreases rapidly for wavelengths greater than the particle size, the scattering of submillimeter radiation is extremely small compared to the visible. In thick clouds, typical estimates for the submillimeter scattering losses are about 20dB/km versus 400dB/km at 0.63$\mu$m. The greater vapor absorption of the submillimeter radiation is well compensated by the low scattering losses under these adverse conditions.

Another potentially important application of these short wavelengths, is in modeling radar systems. Measurements made within hours in the laboratory with model ships and tanks can save time and money in construction of new systems. The size of scale models required at these wavelengths is well suited to machine tolerances and critical measurements.

Secure military communications (ship-ship, ground to air or satellite, air-air) can use the high absorption of $H_2O$ in the atmosphere at particular frequencies and altitudes effectively. It is possible to choose wavelengths where horizontal air to air absorption is less than 0.5dB/km at an altitude of 10 km but where the air to ground path is essentially opaque. It is possible also to operate at wavelengths where the vertical path attenuation from ground to air is acceptable while the horizontal ground-level absorption is extremely high. By correct selection of optical-pumped lasers it is possible to design communications which, in addition to being secure from interception, are virtually impossible to detect.

In the area of basic research submillimeter lasers have already provided a useful source for the magnetospectroscopy of solids. By studying the absorption of radiation in high-purity semiconductors as a function of magnetic fields, impurity concentrations of less than $10^{11}$ cm$^{-3}$ have been identified. Cyclotron-resonance observations of the free electrons produce data on the mobility and effective masers, orders of magnitude more accurate than obtained via indirect measurements. The lasers themselves have yielded new information about the excited states of the lasing molecular gases. The constants determined in this way are extremely valuable for the field of molecular spectroscopy. In the field of astrophysics, where investigation of interstellar molecular sources at submillimeter wavelengths is just beginning, future detectors also can be expected to use these optically-pumped lasers (in conjunction with wideband Schottky-diode mixers) as local oscillators in sensitive heterodyne receivers.

Already, flow discharge molecular lasers such as $H_2O$, $D_2O$, HCN, DCN, $SO_2$ and $H_2S$ have significantly changed the nature of submillimeter techniques. But, in the variety of molecules it can excite the flow-discharge technique has gone as far as it can go in emission lines and power available. Optical pumping, on the other hand, makes possible the desirable features of near infrared lasers available for far-infrared or submillimeter applications.

Optically pumped lasers, however, are generally cumbersome in design and extremely inefficient in operation. Since the application of submillimeter lasers are greatly increasing it becomes essential to provide optically pumped submillimeter lasers which are both compact in design and highly efficient in operation.

SUMMARY OF THE INVENTION

The instant invention sets forth an optically pumped submillimeter laser system, which by the utilization of diffraction grating coupling, overcomes the problems set forth in detail hereinabove.

In one embodiment of the instant invention, the optically pumped submillimeter laser system utilizes a laser cavity defined by a diffraction grating at one end thereof and a partially transmitting mirror at the other end. The short wavelength pump laser radiation enters the laser cavity through a window located within the cavity housing. The pump or short wavelength radiation is reflected in first order from the diffraction grating which is located at an end of the cavity opposite the partially transmitting reflective surface. The diffraction grating is chosen such that it gives an effective first order reflection along the submillimeter cavity axis at the incident input angle. For the submillimeter or long wavelength, the grating has only a zero order, and is therefore equivalent to a highly reflecting plane mirror.

In another embodiment of the instant invention, the submillimeter laser cavity has a portion thereof in common with the pumping laser cavity. Such an arrangement has heretofore been impossible. As in the arrangement set forth in the first embodiment a diffraction grating is used as an effective first order diffractor for the pump or short wavelength radiation and as a highly reflective mirror for the submillimeter or long wavelength radiation. In this embodiment the pumping laser utilizes a pair of substantially totally reflective mirrors and the diffraction grating, while the submillimeter laser utilizes the same grating and one of the above mentioned mirrors in conjunction with another partially transmitting mirror. The gases for the pumping laser and the submillimeter laser are separated by means of a window which need allow only the short wavelength radiation necessary for optical pumping to pass therethrough.

It is therefore an object of this invention to provide an optically pumped submillimeter laser system which is extremely compact in its construction.

It is another object of this invention to provide an optically pumped submillimeter laser system which is highly efficient in its operation.

It is a further object of this invention to provide an optically pumped submillimeter laser system which utilizes a diffraction grating in optical alignment with the short wavelength pumping radiation for first order reflection and in optical alignment with the long or submillimeter wavelength for zero order reflection.

It is still another object of this invention to provide an optically pumped submillimeter laser system wherein the optical pumping laser shares a portion of the submillimeter laser cavity.

It is still a further object of this invention to provide an optically pumped submillimeter laser system which is economical to produce and which utilizes conventional currently available components that lend themselves to standard mass producing manufacturing techniques.

For a better understanding of the present invention together with other and further objects thereof, reference is now made to the following description taken in conjunction with the accompanying drawing and its scope will be pointed out in the appended claims.

DESCRIPTION OF THE DRAWING

FIG. 1 is a side elevational, schematic illustration of the optically pumped submillimeter laser system of this invention shown partly in cross section; and FIG. 2 is a side elevational, schematic illustration of a modified embodiment of the optically pumped submillimeter laser system of this invention, shown partly in cross section.

DETAILED DESCRIPTION OF THE PREFERRED EMBODIMENT

Reference is now made to FIG. 1 of the drawing which clearly discloses one embodiment of the optically pumped submillimeter laser system 10 of this invention. Submillimeter laser system 10 incorporates therein a submillimeter laser cavity 12 which is defined by a pair of reflective surfaces 14 and 16 held in place by an elongated housing 18 made of any suitable material such as ceramic or metal. Located within housing 18 is any suitable lasing medium 20 such as ammonia or methyl fluoride capable of producing a long or submillimeter wavelength output 21.

The reflective surfaces 14 and 16 of this invention are in the form of a diffraction grating 14 at one end of housing 18 and a partially transmitting mirror 16 at the other end thereof. The details of grating 14 will be set forth hereinbelow. Lasing operation takes place within cavity 12 of laser 10 when the lasing medium or gas 20 is pumped into a particular vibration-rotation level in order to cause inversion of population between this level and a lower rotational level. Once accomplished, laser oscillation at a long or submillimeter wavelength will take place.

Any suitable high power laser source 22 such as a high power $CO_2$ laser capable of producing a short wavelength radiation can be used to optically pump lasing medium or gas 20 into the particular vibration-rotation level. The 10$\mu$m $CO_2$ pump laser radiation 24 enters the submillimeter laser cavity 12 through any suitable window 26 located in housing 18. Window 26 is conventional and capable of passing therethrough short wavelength radiation. Such a window 26 can be made, for example, of zinc selenide. Incoming radiation 24 is reflected in first order from diffraction grating 14 chosen such that it gives an efficient first order reflection along the submillimeter cavity axis at the incident input angle. For the submillimeter or long wavelength, grating 14 has only a zero order reflection. A more detailed analysis of this relationship is set forth hereinbelow.

The grating equation is given by $$\sin \beta - \sin \beta' = \eta \lambda / d$$

where $\beta$ and $\beta'$ are incident and reflected angles, respectively, of a beam with respect to a line normal to the grating; $\eta$ is an integer (0,1,2, . . . ); $\lambda$ is the wavelength and $d$ is the grating groove size (the reciprocal of the number of grooves/mm), the above-mentioned term being a conventional term of art.

A first order blazed grating has grooves shaped to give maximum intensity for $\eta = 1$. For any given $\beta$ this can be virtually 100%. When $\lambda > 2d$ there is no solution for the above equation except for $\eta = 0$. Therefore, for long wavelengths $\beta = \beta'$, the grating behaves like a mirror.

For the situation set forth with respect to laser system 10 of this invention; $\sin \beta' = 0$; $\sin \beta = \lambda/d$ and $d = \lambda/\sin\beta$. Therefore $\sin \beta/\lambda$ lines/mm must be chosen for a convenient $\beta$. For example, if $\beta = 30°$ it is necessary to have $\frac{1}{2}\lambda$ lines/mm which results in a grating 14 with approximately 50 lines/mm for a 10 $\mu$m pump wavelength.

It is clearly evident, therefore, by the utilization of a specific grating 14, a compact, highly efficient submillimeter laser 10 can be produced.

Reference is now made to FIG. 2 of the drawing which sets forth a modified or improved submillimeter laser system 30. Laser system 30 utilizes the principles set forth with respect to the embodiment shown in FIG. 1. As a result thereof, a submillimeter laser system 30 is produced in which the optical pumping means or cavity 32 shares a portion 33 of the submillimeter laser cavity 34. Submillimeter cavity 34 is formed within a housing 35 and is defined by partially transmitting reflective surface or mirror 36, diffraction grating 38 and a substantially totally reflective surface or mirror 40. In laser system 30 optical pumping means 32 is formed within a housing 41 and a portion 42 of housing 35 and is defined by substantially totally reflective surface or mirror 43, grating 38 and mirror 40. As with respect to laser system 10 any suitable Brewster angle window 46 made out of any suitable material such as zinc selenide capable of passing short wavelength radiation therethrough is located in housing 35. Window 46 is in optical alignment with mirror 43 and grating 38 in order to form a chamber 47 between mirror 43 and window 46 within optical pumping cavity 32.

Housing 35 is of an angular construction having reflective surfaces 36 and 40 at opposite ends thereof and grating 38 located intermediate surfaces 36 and 40, all optically aligned with one another. In addition, window 46 is in optical alignment with reflective surface 43 and grating 38. As a result thereof, and as explained in more detail hereinbelow, short wavelength radiation 48 is capable of reflecting between surfaces 40 and 43 and grating 38, and submillimeter or long wavelength radiation 50 is capable of reflecting between surfaces 36 and 40 and grating 38.

Located within laser cavities 32 and 34 are two lasing mediums 52 and 54, respectively, medium 52 being capable of producing short wavelength pumping radiation 48, and medium 54 being capable of producing long or submillimeter wavelength radiation 50. Lasing medium 52 may be $CO_2$ while medium 54 may be ammonia. Although the radiation combines within cavity portion 33, the short wavelength radiation producing medium ($CO_2$) 52 is confined within chamber 47 while the long or submillimeter wavelength radiation producing medium (ammonia) 54 is confined within submillimeter cavity 34.

In operation, the pump or short wavelength radiation 48 is initiated by any conventional electrical discharge circuit 56 operatively connected to housing 41 and capable of producing a lasing action within lasing medium 52. In turn this short wavelength radiation 48 passes through window 46 utilizing grating 38 as an efficient first order diffractor for (for example, the 10μm) the pump radiation 48. Similar to grating 14 in laser 10, grating 38 is used as a mirror for submillimeter radiation 50. The interraction of the pump radiation 48 with lasing medium 54 initiates a lasing action to take place within cavity 34 and efficiently produces an output 58 of long or submillimeter wavelength.

More specifically, with respect to the embodiment shown in FIG. 2, $$\sin \beta - \sin \beta' = \lambda/d; d = \lambda/(\sin \beta - \sin \beta')$$

If, for example, $\beta = 60°$ and $\beta' = 30°$ then $$d \approx \lambda/\sqrt{3}/2 - \frac{1}{2} \approx 3\lambda.$$

In other words a grating 38 with approximately 33 lines/mm can be used within laser system 30.

Although this invention has been described with reference to particular embodiments, it will be understood to those skilled in the art that this invention is also capable of a variety of alternate embodiments within the spirit and scope of the appended claims.

We claim:

1. An optically pumped laser system for producing an output of submillimeter wavelength radiation comprising a submillimeter laser cavity defined by a housing, a partially transmitting reflective surface located at one end of said housing and a diffraction grating located at the other end of said housing in optical alignment with said partially transmitting reflective surface, means formed in said housing in optical alignment with said grating for allowing pump radiation to pass therethrough, means in optical alignment with said grating for producing said pump radiation, said diffraction grating being oriented with respect to said pump radiation producing means so as to provide first order reflection of said pump radiation along the axis of said submillimeter laser cavity and zero order reflection of said submillimeter wavelength radiation within said submillimeter laser cavity and a lasing medium located within said submillimeter laser cavity whereby said pump radiation optically pumps said lasing medium in said laser cavity.

2. An optically pumped laser system as defined in claim 1 wherein said optical pumping means is in the form of a laser.

3. An optically pumped laser system as defined in claim 2 wherein said means for allowing pump radiation to pass therethrough is in the form of a window which allows 10 μm radiation to pass therethrough.

4. An optically pumped laser system for producing an output of submillimeter wavelength radiation comprising a submillimeter laser cavity defined by a housing, a partially transmitting reflective surface located at one end of said housing, a substantially totally reflective surface located at the other end of said housing in optical alignment with said partially transmitting reflective surface, a diffraction grating, said diffraction grating being situated intermediate said partially transmitting reflective surface and said substantially totally reflective surface, means formed in said housing in optical alignment with said grating for allowing pump radiation to pass therethrough, means for producing said pump radiation, said pump radiation producing means being in the form of a laser cavity, said pumping laser cavity sharing a portion of said submillimeter laser cavity and being defined by another substantially totally reflecting surface, said diffraction grating and said substantially totally reflective surface of said submillimeter laser cavity, said diffraction grating being oriented so as to provide first order reflection of said pump radiation, reflecting said pump radiation substantially perpendicular to both of said substantially totally reflective surfaces and zero order reflection of said submillimeter wavelength radiation, reflecting said submillimeter wavelength radiation substantially perpendicular to said partially transmitting reflective surface and said substantially totally reflective surface of said submillimeter laser cavity and a lasing medium located within said submillimeter laser cavity whereby said pump radiation optically pumps said lasing medium in said submillimeter laser cavity.

5. An optically pumped laser system as defined in claim 4 wherein said means for allowing said pump radiation to pass therethrough is located in optical alignment with said grating and said pair of substantially totally reflective surfaces, and a chamber formed between said other of said totally reflective surfaces and said means for allowing pump radiation to pass therethrough.

6. An optically pumped laser system as defined in claim 5 wherein said chamber contains a lasing medium therein, said lasing medium in said chamber being different than said lasing medium in said submillimeter laser cavity.

7. An optically pumped laser system as defined in claim 6 wherein said means for allowing pump radiation to pass therethrough is in the form of a window which allows 10 μm radiation to pass therethrough.

8. An optically pumped laser system as defined in claim 7 wherein said lasing medium in said chamber is carbon dioxide and said lasing medium in said submillimeter laser cavity is ammonia.

* * * * *

UNITED STATES PATENT OFFICE
CERTIFICATE OF CORRECTION

Patent No. 4,126,832  Dated November 21, 1978

Inventor(s) Howard R. Schlossberg and Harold R. Fetterman

It is certified that error appears in the above-identified patent and that said Letters Patent are hereby corrected as shown below:

Column 5, line 43

"$d \approx \lambda/ \sqrt{3}/2 - 1/2 \approx 3\lambda$" should read

-- $d \approx \dfrac{\lambda}{\sqrt{3}/2 - 1/2} \approx 3\lambda$ --

Signed and Sealed this

Twenty-fourth Day of April 1979

[SEAL]

Attest:

RUTH C. MASON
Attesting Officer

DONALD W. BANNER
Commissioner of Patents and Trademarks